United States Patent
Yang et al.

(10) Patent No.: US 12,192,996 B2
(45) Date of Patent: Jan. 7, 2025

(54) METHOD AND DEVICE FOR TRANSMITTING AND RECEIVING SIGNALS IN WIRELESS COMMUNICATION SYSTEM

(71) Applicant: LG Electronics Inc., Seoul (KR)

(72) Inventors: Suckchel Yang, Seoul (KR); Joonkui Ahn, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 455 days.

(21) Appl. No.: 17/428,902

(22) PCT Filed: Feb. 17, 2020

(86) PCT No.: PCT/KR2020/002267
§ 371 (c)(1),
(2) Date: Aug. 5, 2021

(87) PCT Pub. No.: WO2020/167104
PCT Pub. Date: Aug. 20, 2020

(65) Prior Publication Data
US 2022/0061073 A1    Feb. 24, 2022

Related U.S. Application Data

(60) Provisional application No. 62/911,073, filed on Oct. 4, 2019, provisional application No. 62/811,487, filed on Feb. 27, 2019.

(30) Foreign Application Priority Data

Feb. 15, 2019   (KR) .................. 10-2019-0018276
Mar. 29, 2019   (KR) .................. 10-2019-0036554

(51) Int. Cl.
H04W 72/12      (2023.01)
H04L 1/1812     (2023.01)
(Continued)

(52) U.S. Cl.
CPC ....... *H04W 72/1273* (2013.01); *H04L 1/1812* (2013.01); *H04W 72/23* (2023.01); *H04W 72/542* (2023.01); *H04W 76/16* (2018.02)

(58) Field of Classification Search
None
See application file for complete search history.

(56) References Cited

U.S. PATENT DOCUMENTS

2013/0329688 A1    12/2013   Yang et al.
2015/0003353 A1    1/2015    Yang et al.
(Continued)

FOREIGN PATENT DOCUMENTS

CN    104081705      10/2014
KR    20150016473    2/2015
(Continued)

OTHER PUBLICATIONS

International Search Report and Written Opinion in International Appln. No. PCT/KR2020/002267, Jun. 3, 2020, 16 pages (with English translation).

(Continued)

*Primary Examiner* — Pamit Kaur
(74) *Attorney, Agent, or Firm* — Fish & Richardson P.C.

(57) ABSTRACT

In a method and device for a wireless communication system according to one embodiment of the present invention, downlink control information (DCI) for downlink data transmission on a primary cell (PCell) is received, a downlink assignment index (DAI) value included in the DCI is 1, the downlink data is received on the basis of the DCI, and hybrid automatic repeat request (HARQ) information about the downlink data is transmitted. In addition, on the basis of a channel state information (CSI) and/or scheduling request (SR) transmission set in a subframe in which the HARQ information is transmitted, (i) the HARQ information and (Continued)

(ii) the CSI and/or the SR are transmitted together in the subframe, and on the basis of multi radio-dual connectivity (MR-DC) being set in a terminal, (i) the HARQ information and (ii) the CSI and/or the SR are transmitted on a resource related to PUCCH format 3.

12 Claims, 13 Drawing Sheets

(51) Int. Cl.
*H04W 72/1273* (2023.01)
*H04W 72/23* (2023.01)
*H04W 72/542* (2023.01)
*H04W 76/16* (2018.01)

(56) References Cited

U.S. PATENT DOCUMENTS

| | | | | |
|---|---|---|---|---|
| 2015/0016353 A1* | 1/2015 | Lee | ............... | H04L 1/1854 370/329 |
| 2015/0215079 A1* | 7/2015 | Park | ............... | H04L 5/0055 370/280 |
| 2016/0065345 A1* | 3/2016 | Kim | ............... | H04W 72/20 370/330 |
| 2016/0345199 A1* | 11/2016 | Nogami | ............... | H04L 5/0007 |
| 2017/0094642 A1 | 3/2017 | Lee et al. | | |
| 2021/0218542 A1* | 7/2021 | Ohuchi | ............... | H04L 1/1861 |

FOREIGN PATENT DOCUMENTS

| | | |
|---|---|---|
| KR | 20160108468 | 9/2016 |
| KR | 20170089962 | 8/2017 |
| WO | WO2015115818 | 8/2015 |

OTHER PUBLICATIONS

3GPP, "3rd Generation Partnership Project; Technical Specification Group Radio Access Network; NR; Physical layer procedures for control (Release 15)," TS 38.213 V15.4.0, Dec. 2018, 104 pages.

Office Action in Chinese Appln. No. 202080014036.9, mailed on Jul. 19, 2023, 18 pages (with English translation).

* cited by examiner

METHOD AND DEVICE FOR TRANSMITTING AND RECEIVING SIGNALS IN WIRELESS COMMUNICATION SYSTEM

CROSS-REFERENCE TO RELATED APPLICATIONS

This application is a National Stage application under 35 U.S.C. § 371 of International Application No. PCT/KR2020/002267, filed on Feb. 17, 2020, which claims the benefit of U.S. Provisional Application No. 62/911,073, filed on Oct. 4, 2019, Korean Application No. 10-2019-0036554, filed on Mar. 29, 2019, U.S. Provisional Application No. 62/811,487, filed on Feb. 27, 2019, and Korean Application No. 10-2019-0018276, filed on Feb. 15, 2019. The disclosures of the prior applications are incorporated by reference in their entirety.

TECHNICAL FIELD

The present disclosure relates to a method and apparatus used in a wireless communication system, and more particularly, to a method and apparatus for transmitting and receiving signals in relation to dual connectivity.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

An object of the present disclosure is to provide a method and apparatus for transmitting and receiving signals to efficiently perform an uplink control information (UCI) transmission in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

According to an aspect of the present disclosure, a method of transmitting and receiving a signal, performed by a user equipment (UE), in a wireless communication system includes receiving downlink control information for a transmission of downlink data on a primary cell (PCell), wherein a downlink assignment index (DAI) value included in the DCI is 1, receiving the downlink data based on the DCI; and transmitting hybrid automatic repeat request (HARQ) information for the downlink data. Based on a channel state information (CSI) transmission and/or a scheduling request (SR) transmission being configured in a subframe in which the HARQ information is transmitted, (i) the HARQ information and (ii) CSI and/or an SR are transmitted together in the subframe. Based on multi-radio dual connectivity (MR-DC) being configured for the UE, (i) the HARQ information and (ii) the CSI and/or the SR are transmitted in a resource related to physical uplink control channel (PUCCH) format 3.

According to another embodiments of the present disclosure, a communication device operating in a wireless communication system includes at least one transceiver, at least one processor, and at least one memory operably coupled to the at least one processor and storing instructions which when executed, cause the at least one processor to perform a specific operation. The specific operation includes receiving downlink control information for a transmission of downlink data on a PCell, wherein a DAI value included in the DCI is 1, receiving the downlink data based on the DCI, and transmitting HARQ information for the downlink data. Based on a CSI transmission and/or an SR transmission being configured in a subframe in which the HARQ information is transmitted, (i) the HARQ information and (ii) CSI and/or an SR are transmitted together in the subframe. Based on MR-DC being configured for the UE, (i) the HARQ information and (ii) the CSI and/or the SR are transmitted in a resource related to PUCCH format 3.

According to another aspect of the present disclosure, an apparatus for a UE includes at least one processor, and at least one computer memory operably coupled to the at least one processor and when executed, causing the at least one processor to perform an operation. The operation includes receiving downlink control information for a transmission of downlink data on a PCell, wherein a DAI value included in the DCI is 1, receiving the downlink data based on the DCI, and transmitting HARQ information for the downlink data. Based on a CSI transmission and/or an SR transmission being configured in a subframe in which the HARQ information is transmitted, (i) the HARQ information and (ii) CSI and/or an SR are transmitted together in the subframe. Based on MR-DC being configured for the UE, (i) the HARQ information and (ii) the CSI and/or the SR are transmitted in a resource related to PUCCH format 3.

According to another aspect of the present disclosure, a computer-readable storage medium including at least one computer program which when executed, causes at least one processor to perform an operation. The operation includes receiving downlink control information for a transmission of downlink data on a PCell, wherein a DAI value included in the DCI is 1, receiving the downlink data based on the DCI, and transmitting HARQ information for the downlink data. Based on a CSI transmission and/or an SR transmission being configured in a subframe in which the HARQ information is transmitted, (i) the HARQ information and (ii) CSI and/or an SR are transmitted together in the subframe. Based on MR-DC being configured for the UE, (i) the HARQ information and (ii) the CSI and/or the SR are transmitted in a resource related to PUCCH format 3.

In the methods and apparatuses, based on MR-DC not being configured for the UE, (i) the HARQ information and (ii) the CSI and/or the SR may be transmitted in a resource related to PUCCH format 1a, 1b, 2a, and/or 2c.

In the methods and apparatuses, based on a transmission of second HARQ formation for a semi-persistent scheduling (SPS) physical downlink shared channel (PDSCH) reception being configured in a subframe in which the HARQ information is transmitted, (i) the HARQ information and (iii) the second HARQ information may be transmitted together in the subframe. Based on MR-DC being configured for the UE, (i) the HARQ information and (ii) the second HARQ information may be transmitted in a resource related to PUCCH format 3.

In the methods and apparatuses, based on MR-DC being configured for the UE and a system information block-uplink-downlink (SIB-UL-DL) configuration configured for the UE, UL-DL configurations available as a downlink reference UL-DL configuration may be determined.

In the methods and apparatuses, based on the UL-DL configurations available as the DL reference UL-DL configuration, a UL reference UL-DL configuration for a transmission of UL data may be configured.

The communication device may include an autonomous driving vehicle communicable with at least a UE, a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to an embodiment of the present disclosure, a communication device may transmit uplink control information (UCI) more efficiently by an operation differentiated from a conventional invention.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
  36.211: Physical channels and modulation
  36.212: Multiplexing and channel coding
  36.213: Physical layer procedures
  36.300: Overall description
  36.331: Radio Resource Control (RRC)
3GPP NR
  38.211: Physical channels and modulation
  38.212: Multiplexing and channel coding
  38.213: Physical layer procedures for control
  38.214: Physical layer procedures for data
  38.300: NR and NG-RAN Overall Description
  38.331: Radio Resource Control (RRC) protocol specification FIG. 1 illustrates radio frame structures in LTE.

Figure 1:
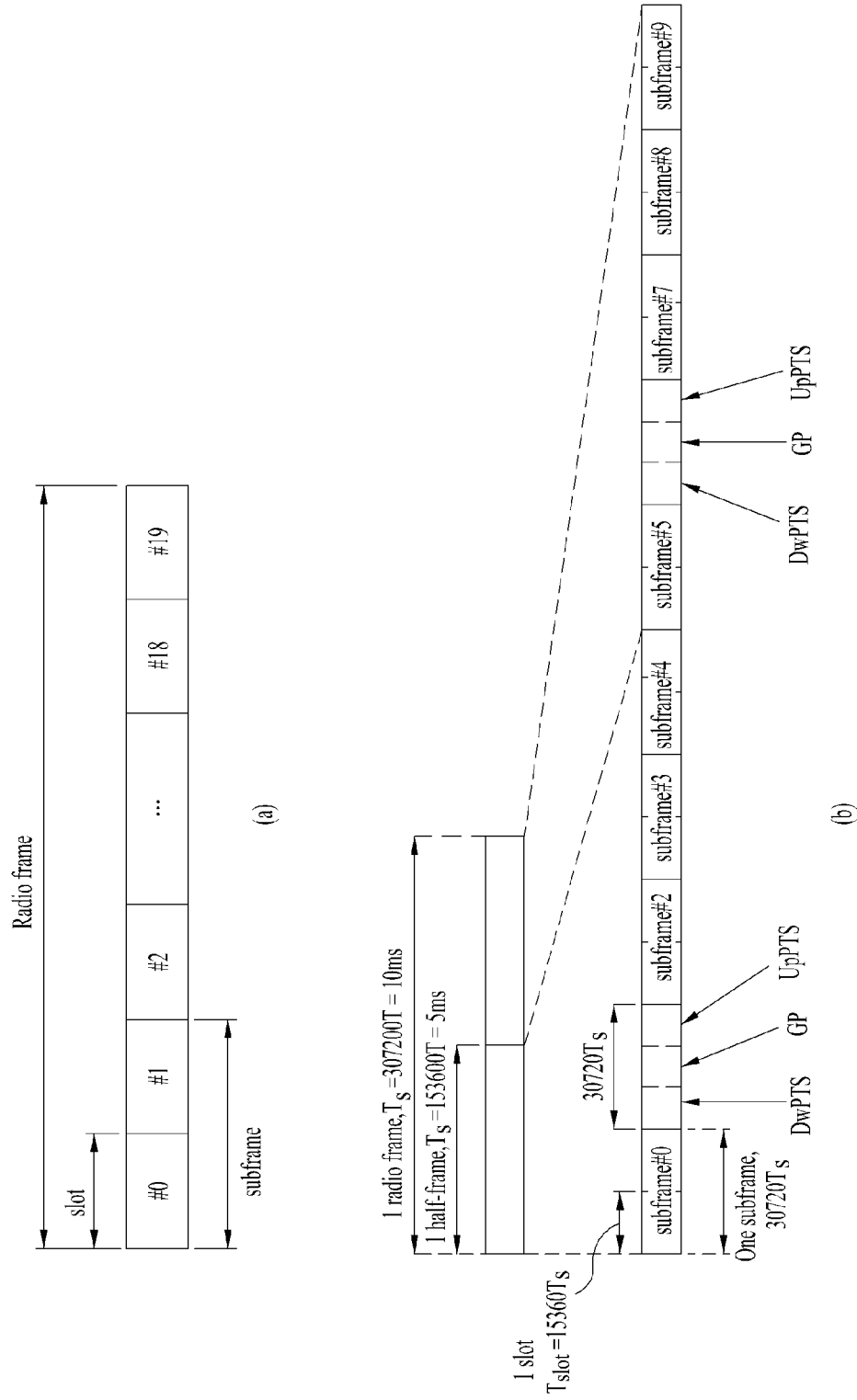
FIGS. 1 and 2 illustrate radio frame structures.

FIG. 1(*a*) illustrates frame structure type 1. Frame structure type 1 is applicable to both a full-duplex frequency division duplex (FDD) system and a half-duplex FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a transmission time interval (TTI). $T_s$ is a sampling time given as $T_s=1/(15 \text{ kHz} \times 2048)=3.2552 \times 10^{-8}$ (about 33 ns). One slot includes a plurality of orthogonal frequency division multiplexing (OFDM) symbols or SC-FDMA symbols in the time domain by a plurality of resource blocks (RBs) in the frequency domain.

One slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full-duplex FDD system, each of 10 subframes may be used simultaneously for DL transmission and UL transmission during a 10-ms duration. The DL transmission and the UL transmission are distinguished by frequency. On the other hand, a UE may not perform transmission and reception simultaneously in a half-duplex FDD system.

The above radio frame structure is purely exemplary. Thus, the number of subframes in a radio frame, the number of slots in a subframe, and the number of OFDM symbols in a slot may be changed.

FIG. 1(b) illustrates frame structure type 2. Frame structure type 2 is applied to a time division duplex (TDD) system. One radio frame is 10 ms ($T_r=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, downlink pilot time slot (DwPTS), guard period (GP), and uplink pilot time slot (UpPTS). The DwPTS is used for initial cell search, synchronization, or channel estimation at a UE, and the UpPTS is used for channel estimation and UL transmission synchronization with a UE at a base station (BS). The GP is used to cancel UL interference between a UL and a DL, caused by the multi-path delay of a DL signal.

Table 1 below lists special subframe configurations (DwPTS/GP/UpPTS lengths).

In the above Table 2, D means the downlink subframe, U means the uplink subframe, and S means the special subframe. Also, Table 2 also illustrates a downlink-uplink switching period in the uplink/downlink subframe configuration of each system.

Figure 2:
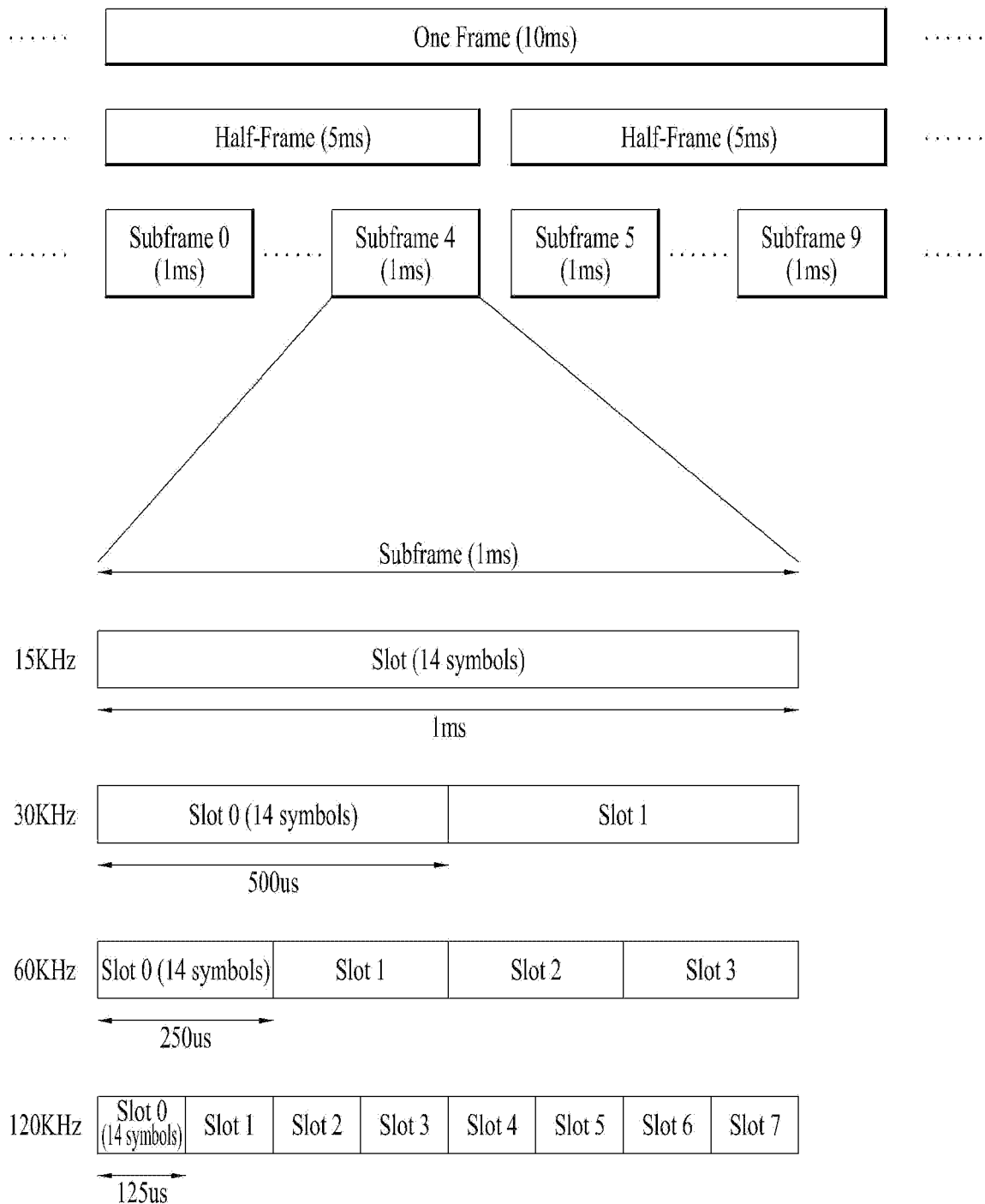

FIG. 2 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM (A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 3 exemplarily illustrates that the number of symbols per slot, the number of slots per frame, and the number of slots per subframe vary according to SCSs in a normal CP case.

TABLE 3

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |

TABLE 1

| | Normal cyclic prefix in downlink | | | Extended cyclic prefix in downlink | | |
|---|---|---|---|---|---|---|
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 3-continued

| SCS (15*2^u) | $N^{slot}_{symb}$ | $N^{frame, u}_{slot}$ | $N^{subframe, u}_{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 4 illustrates that the number of symbols per slot, the number of slots per frame, and the number of slots per subframe vary according to SCSs in an extended CP case.

TABLE 4

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM (A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 3:
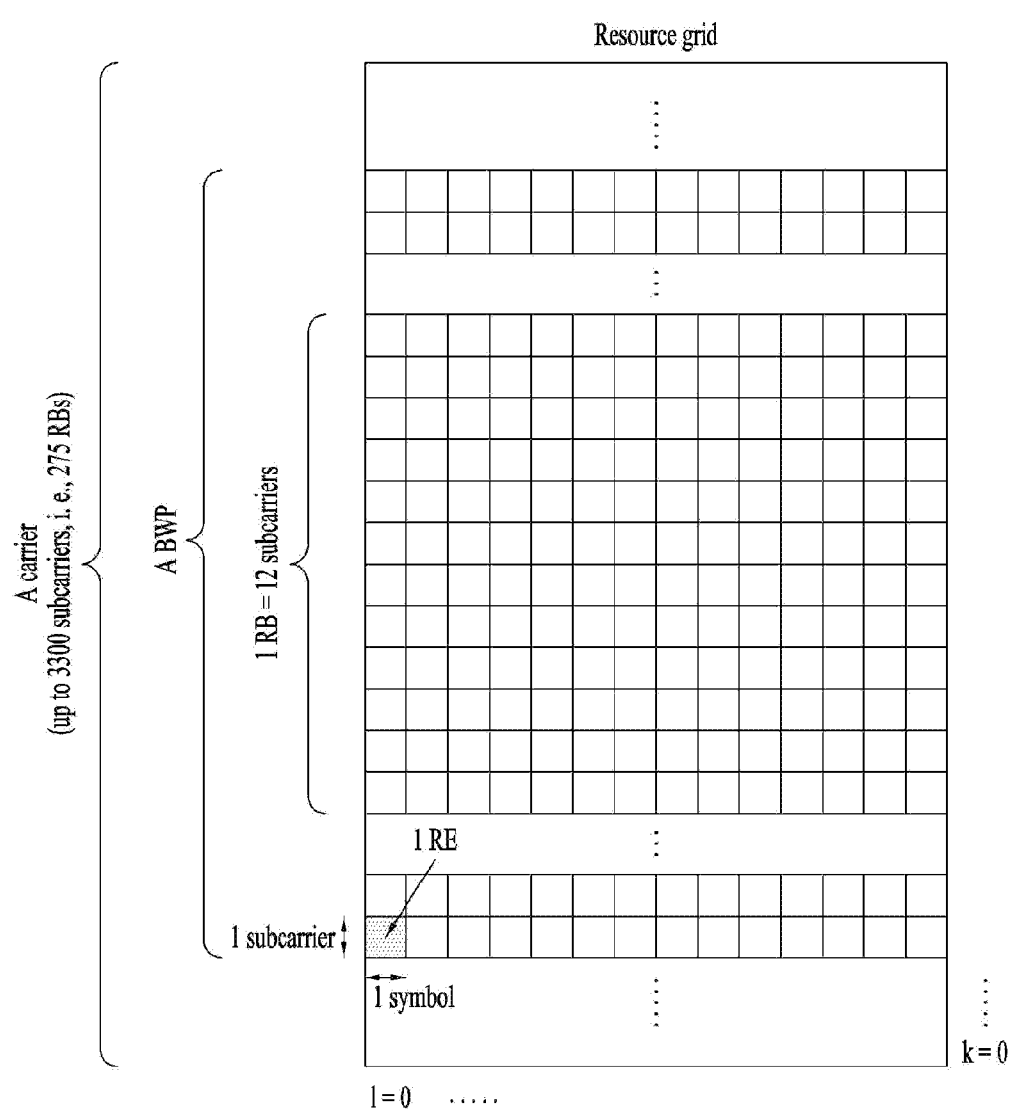
FIG. 3 illustrates a resource grid during the duration of a slot.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P) RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 4:
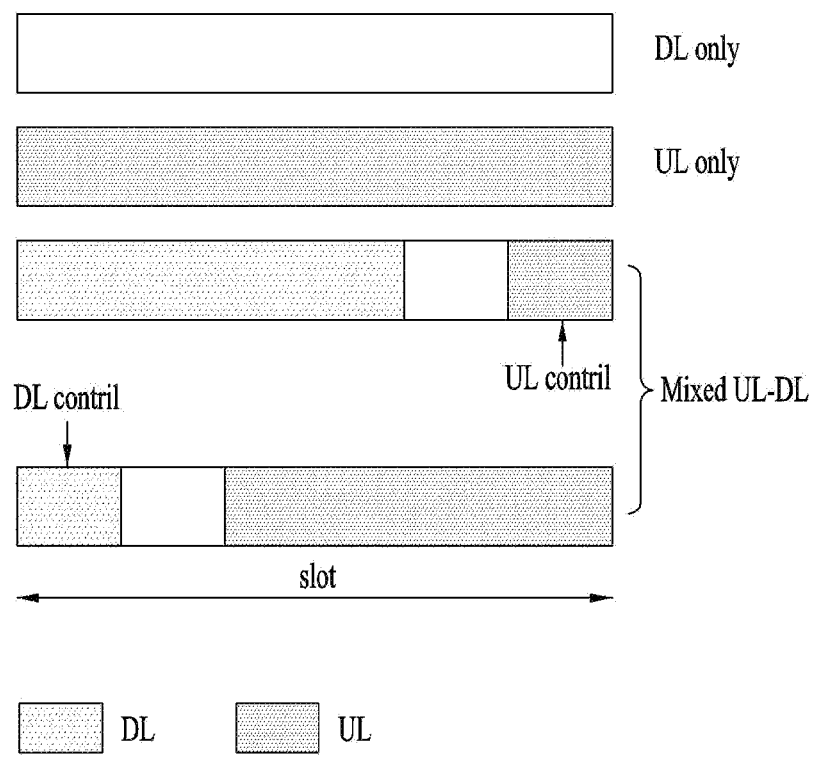
FIG. 4 illustrates a self-contained slot structure.

FIG. 4 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration

DL region+Guard period (GP)+UL control region

DL control region+GP+UL region

DL region: (i) DL data region, (ii) DL control region+DL data region

UL region: (i) UL data region, (ii) UL data region+UL control region

The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a BS may be, for example, a gNode B (gNB).

Figure 5:
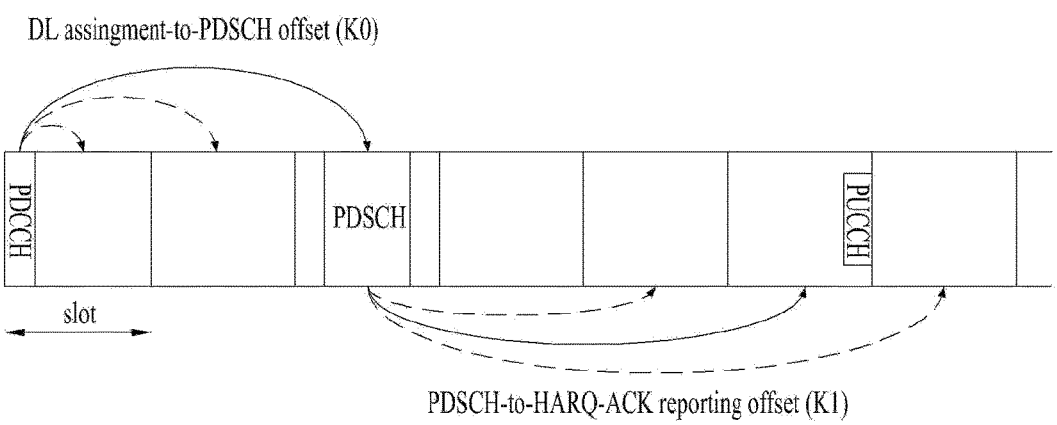
FIG. 5 illustrates an acknowledgment/negative acknowledgment (ACK/NACK) transmission process.

FIG. 5 illustrates an ACK/NACK transmission process. Referring to FIG. 4, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 or DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving a PDSCH in slot #(n+K0) according to the scheduling information of slot #n, the UE may transmit UCI on a PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 6:
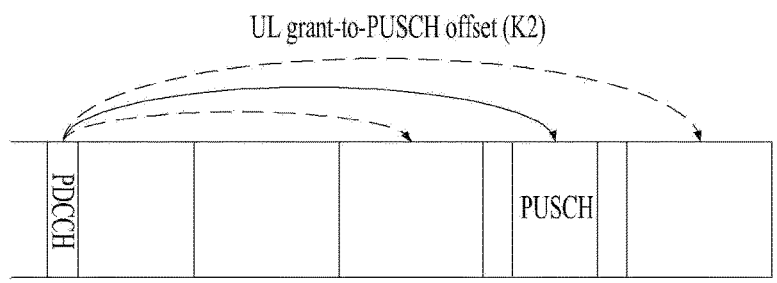
FIG. 6 illustrates an exemplary physical uplink shared channel (PUSCH) transmission process.

FIG. 6 illustrates an exemplary PUSCH transmission process. Referring to FIG. 5, the UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

FIG. 6 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

DL HARQ Procedure for PDSCH

Figures 7, 8:
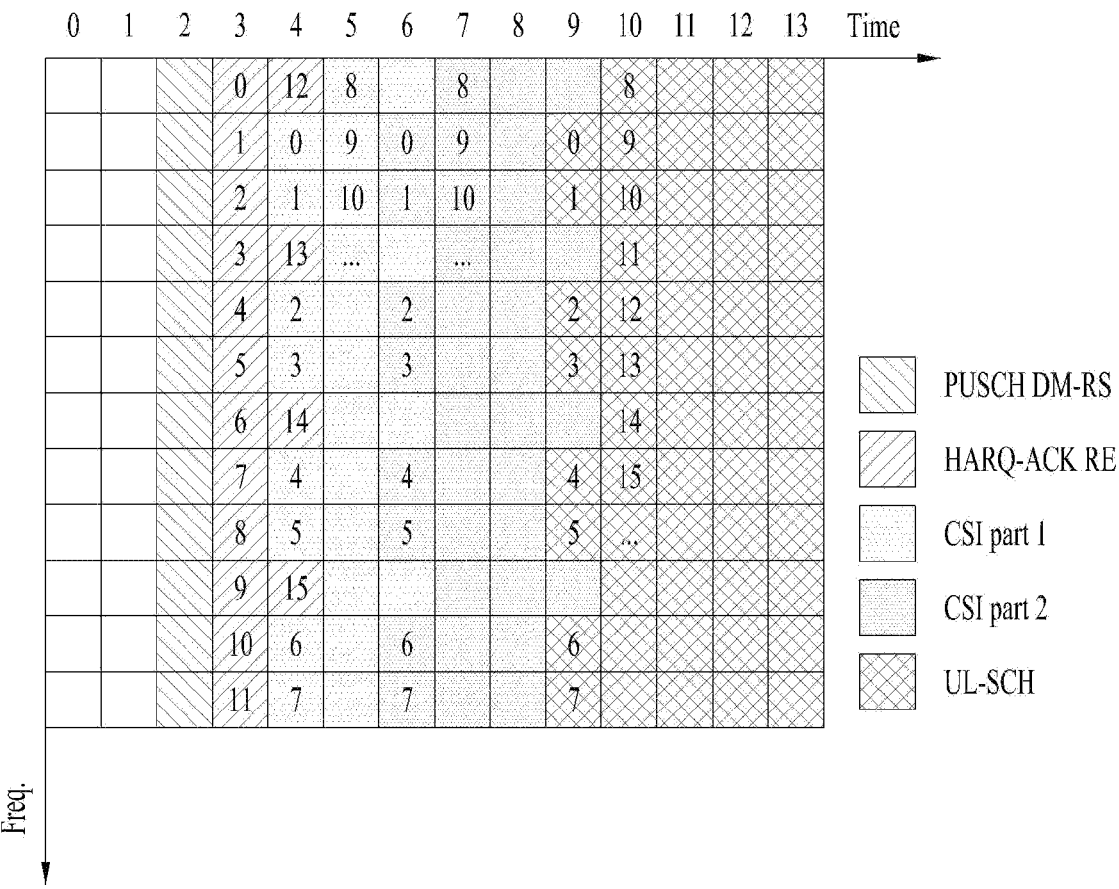
FIG. 7 illustrates exemplary multiplexing of uplink control information (UCI) in a PUSCH.
FIGS. 8 to 16 illustrate hybrid automatic repeat request (HARQ)-ACK transmissions according to an embodiment of the present disclosure.

FIG. 8 illustrates a TDD UL ACK/NACK transmission process in a single cell situation.

Referring to FIG. 8, a UE may receive one or more DL transmissions (e.g., PDSCH signals) in M DL subframes (SFs) (S502_0 to S502_M−1). Each PDSCH signal is used to transmit one or more (e.g., two) transport blocks (TBs) (or codewords (CWs)) according to a transmission mode. While not shown, PDCCH signals requiring ACK/NACK responses, for example, PDCCH signals indicating SPS release (referred to simply as SPS release PDCCH signals) may also be received in steps S502_0 to S502_M−1. In the presence of PDSCH signals and/or SPS release PDCCH signals in the M DL SFs, the UE transmits an ACK/NACK in one UL SF corresponding to the M DL SFs in an ACK/NACK transmission process (e.g., ACK/NACK (payload) generation, ACK/NACK resource allocation, and so on) (S504). The ACK/NACK includes reception response information for the PDSCH signals and/or the SPS release PDCCH signals received in steps S502_0 to S502_M−1. Although the ACK/NACK is basically transmitted on a PUCCH, the ACK/NACK may be transmitted on a PUSCH in the presence of a PUSCH transmission at an ACK/NACK transmission timing. Various PUCCH formats may be available for the ACK/NACK transmission. To reduce the number of transmitted ACK/NACK bits, various methods such as ACK/NACK bundling and ACK/NACK channel selection may be used.

As described above, in TDD, an ACK/NACK for data received in M DL SFs is transmitted in one UL SF (i.e. M DL SF(s): 1 UL SF), and the DL SF-UL SF association is given by a downlink association set index (DASI).

Table 5 illustrates DASI K: {k0, k1, . . . kM−1} defined in LTE(-A). Table 5 lists intervals to DL SFs associated with UL SFs each carrying an ACK/NACK, counted from the UL SFs. Specifically, when SF #(n−k) (k∈K) carries a PDSCH and/or an SPS release PDCCH, the UE transmits a corresponding ACK/NACK in SF #n.

ACK/NACK responses for the plurality of data units are identified by combinations of PUCCH resources used for an actual ACK/NACK transmission and transmitted ACK/NACK contents (e.g., bit values or QPSK symbol values). Channel selection is also called ACK/NACK selection or PUCCH selection.

Figure 9:
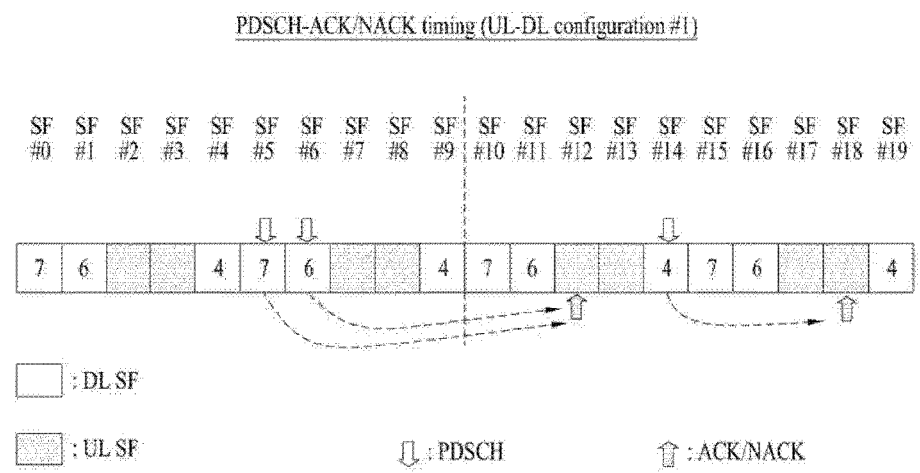

FIG. 9 illustrates a UL ACK/NACK transmission timing in UL-DL configuration #1. In FIG. 9, SF #0 to SF #9 and SF #10 to SF #19 correspond to radio frames, respectively. In FIG. 9, numerals inside boxes represent UL subframes associated with DL subframes. For example, an ACK/NACK for a PDSCH received in SF #5 is transmitted in SF #12 (=SF #5+7), and an ACK/NACK for a PDSCH received in SF #6 is transmitted in SF #12 (=SF #6+6). Accordingly, both ACKs/NACKs for the DL signals received in SF #5 and SF #6 are transmitted in SF #12. Likewise, an ACK/NACK for a PDSCH received in SF #14 is transmitted in SF #18 (=SF #14+4).

UL HARQ Procedure for PUSCH

The physical HARQ indicator channel (PHICH) conveys an ACK/NACK signal for UL HARQ. An ACK/NACK signal for UL data transmitted on a PUSCH by a wireless device is transmitted on the PHICH.

In a normal HARQ operation with UL-DL configurations #1 to #6, upon detection of a UL grant PDCCH and/or a PHICH in SF #n, the UE transmits a corresponding PUSCH signal in SF #(n+k) (see Table 5) according to information of the PDCCH and/or the PHICH.

In a normal HARQ operation with UL-DL configuration #0, upon detection of a UL grant PDCCH and/or a PHICH in SF #n, the PUSCH transmission timing of the UE varies with conditions. First, when the most significant bit (MSB) of a UL index in DCI is 1 or the PHICH is received in a resource corresponding to IPHICH-0 in SF #0 or SF #5, the UE transmits a corresponding PUSCH signal in SF #(n+k) (see Table 5). When the least significant bit (LSB) of the UL index in the DCI is 1, the PHICH is received in a resource corresponding to IPHICH=1 in SF #0 or SF #5, or the

TABLE 5

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | — | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for one or more DL transmissions (e.g., PDSCHs) received in M DL SFs in one UL SF. An ACK/NACK for a plurality of DL SFs is transmitted in one UL SF in the following methods.

1) ACK/NACK bundling: ACK/NACK bits for a plurality of data units (e.g., PDSCHs or SPS release PDCCHs) are combined by a logic operation (e.g., logic-AND operation). For example, when all data units are successfully decoded, a receiver (e.g., UE) transmits an ACK signal, and when decoding (or detection) of at least one of the data units is failed, the receiver transmits a NACK signal or no signal.

2) Channel selection: A UE receiving a plurality of data units (e.g., PDSCHs or SPS release PDCCHs) occupies a plurality of PUCCH resources for an ACK/NACK transmission.

PHICH is received in SF #1 or SF #6, the UE transmits a corresponding PUSCH signal in SF #(n+7). When both the MSB and the LSB are set in the DCI, the UE transmits a corresponding PUSCH signal in SF #(n+k) (see Table 6) and SF #(n+7).

Figure 10:
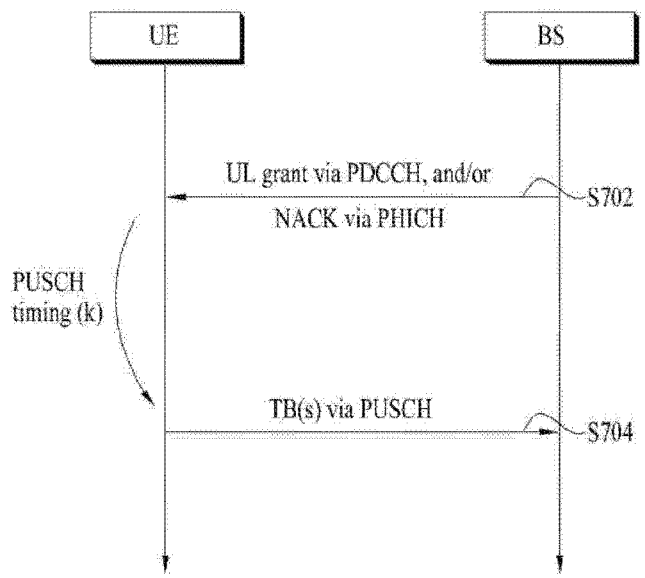
Figure 11:
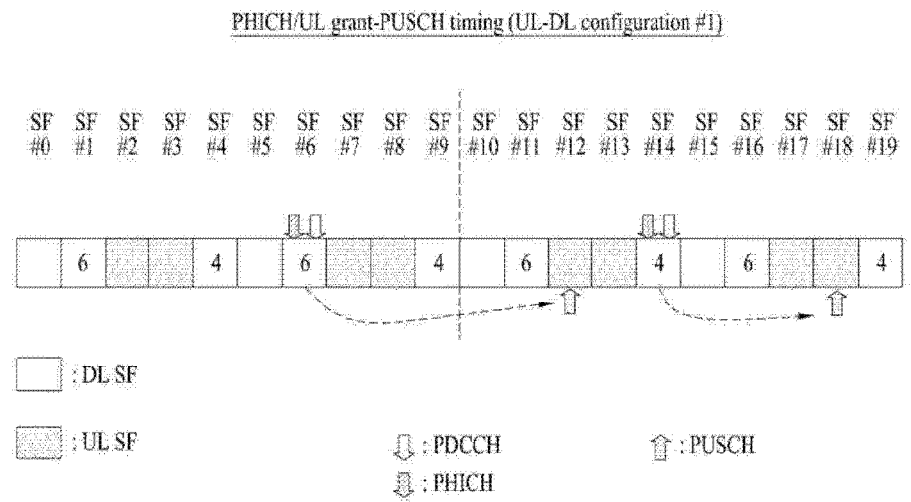

FIGS. 10 and 11 illustrate a PHICH/UL grant (UG)-PUSCH timing. A PUSCH may be transmitted in response to a PDCCH (UG) and/or a PHICH (NACK).

Referring to FIG. 10, the UE may receive a PDCCH (UL grant) and/or a PHICH (NACK) (S702). The NACK corresponds to an ACK/NACK response for a previous PUSCH transmission. In this case, the UE may initially transmit/retransmit one or more TBs on a PUSCH after k SFs in a PUSCH transmission process (e.g., TB encoding, TB-CW swapping, PUSCH resource allocation, and so on) (S704).

This example is based on the assumption of a normal HARQ operation in which a PUSCH is transmitted once. In this case, the PHICH and/or the UL grant corresponding to the PUSCH exists in the same SF. However, in the case of SF bundling in which the PUSCH is transmitted a plurality of times over a plurality of SFs, the PHICH and/or the UL grant corresponding to the PUSCH transmissions may exist in different SFs.

Table 6 illustrates uplink association index (UAI) k for a PUSCH transmission in LTE (-A). Table 6 lists intervals to UL SFs associated with DL SFs in which PHICHs/UL grants have been detected, counted from the DL SFs. Specifically, upon detection of a PHICH/UL grant in SF #n, the UE may transmit a PUSCH in SF #(n+k).

TABLE 6

| TDD UL-DL | subframe number n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 6 | | | | 4 | 6 | |
| 1 | | | 6 | | | 4 | | | 6 | |
| 2 | | | | | 4 | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

FIG. 11 illustrates exemplary PUSCH transmission timings for UL/DL configuration #1. In FIG. 11, SF #0 to SF #9 and SF #10 to SF #19 correspond to radio frames, respectively. In FIG. 11, numerals inside boxes represent UL SFs associated with DL SFs. For example, a PUSCH for a PHICH/UL grant received in SF #6 is transmitted in SF #12 (=SF #6+6), and a PUSCH for a PHICH/UL grant received in SF #14 is transmitted in SF #18 (=SF #14+4).

Figure 12:
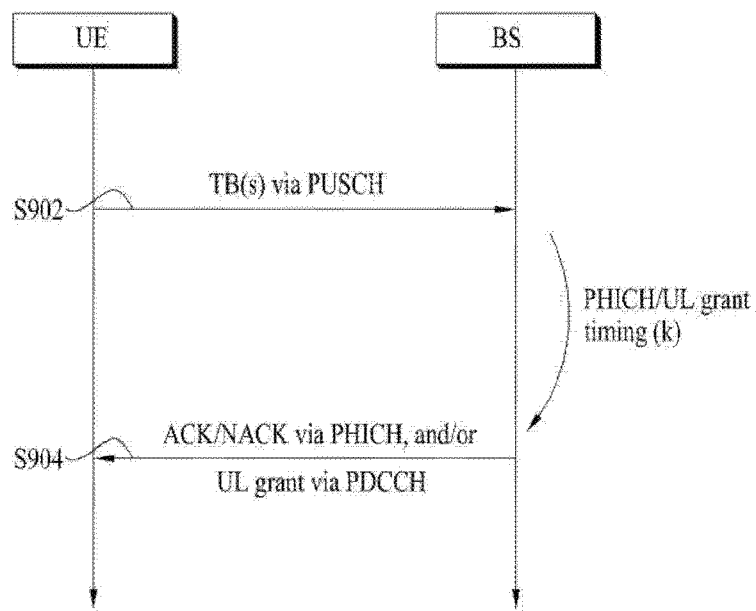
Figure 13:
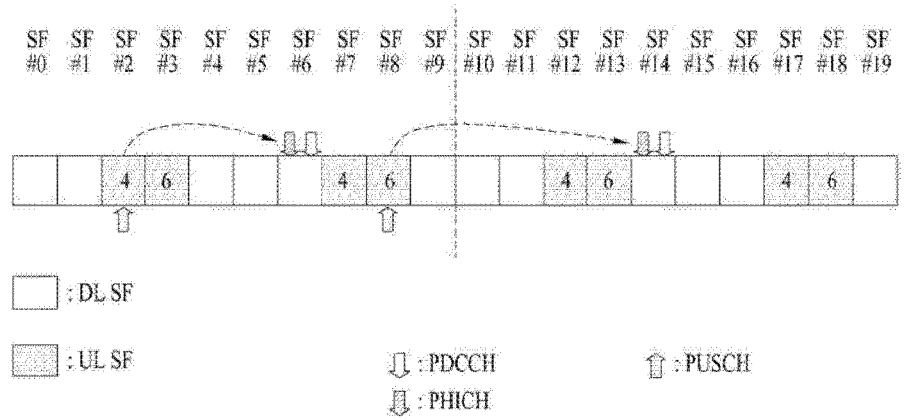

FIGS. 12 and 13 illustrate a PUSCH-PHICH/UL grant timing. A PHICH is used to transmit a DL ACK/NACK. The DL ACK/NACK is an ACK/NACK transmitted on UL in response to UL data (e.g., a PUSCH).

Referring to FIG. 12, a UE transmits a PUSCH signal to a BS (S902). The PUSCH signal delivers one or more (e.g., two) TBs according to a transmission mode. The BS may transmit an ACK/NACK on a PHICH after k SFs in an ACK/NACK transmission process (e.g., ACK/NACK generation, ACK/NACK resource allocation, and so on) in response to the PUSCH transmission (S904). The ACK/NACK includes reception response information for the PUSCH signal received in step S902. When the response to the PUSCH transmission is a NACK, the BS may transmit a UL grant PDCCH for a PUSCH retransmission to the UE after k SFs (S904). This example is based on the assumption of a normal HARQ operation in which a PUSCH is transmitted once. In this case, the PHICH and/or the UL grant corresponding to the PUSCH transmission may be transmitted in the same SF. However, in the case of SF bundling, the PHICH and/or the UL grant corresponding to the PUSCH transmission may be transmitted in different SFs.

Table 7 illustrates UAI k for a PHICH/UL grant transmission in LTE (-A). Table 7 lists intervals to UL SFs associated with DL SFs carrying PHICHs/UL grants, counted from the DL SFs. Specifically, a PHICH/UL grant in SF #i corresponds to a PUSCH transmission in SF #(i-k).

TABLE 7

| TDD UL-DL | subframe number i | | | | | | | | | |
|---|---|---|---|---|---|---|---|---|---|---|
| Configuration | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | 6 | | | | | | 6 | |
| 3 | 6 | | | | | | | 6 | 6 | |
| 4 | | | | | | | | 6 | 6 | |
| 5 | | | | | | | | 6 | | |
| 6 | 6 | 4 | | | | 7 | 4 | | | 6 |

FIG. 13 illustrates exemplary PUSCH transmission timings in UL/DL configuration #1. In FIG. 13, SF #0 to SF #9 and SF #10 to SF #19 correspond to radio frames, respectively. In FIG. 13, numerals inside boxes represent UL SFs associated with DL SFs. For example, a PHICH/UL grant for a PUSCH received in SF #2 is transmitted in SF #6 (=SF #2+4), and a PHICH/UL grant for a PUSCH received in SF #8 is transmitted in SF #14 (=SF #8+6).

Now, a description will be given of PHICH resource allocation. In the presence of a PUSCH transmission in SF #n, the UE determines a corresponding PHICH resource in SF #(n+kPHICH). In FDD, kPHICH has a fixed value (e.g., 4). In TDD, kPHICH has a variable value according to a UL-DL configuration. Table 8 lists kPHICH values in TDD, equivalent to Table 9.

TABLE 8

| TDD UL-DL | UL subframe index n | | | | | | | | | |
|---|---|---|---|---|---|---|---|---|---|---|
| Configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is given by [PHICH group index, orthogonal sequence index]. The PHICH group index and the orthogonal sequence index are determined by using (i) a smallest PRB index used for a PUSCH transmission and (ii) a 3-bit field value for demodulation reference signal (DMRS) cyclic shift. (i) and (ii) are indicated by a UL grant PDCCH.

An HARQ process will be described below. There are plurality of parallel HARQ processes for UL transmissions at the UE. The plurality of parallel HARQ processes enable continuous UL transmissions, while the UE is waiting for an HARQ feedback indicating successful or failed reception of a previous UL transmission. Each HARQ process is associated with an HARQ buffer in the medium access control (MAC) layer. The HARQ process manages state variables such as the transmission number of a MAC physical data unit (PDU), an HARQ feedback for a MAC PDU in the buffer, and a current redundancy version.

In LTE (-A) FDD, there are 8 UL HARQ processes for a non-subframe bundling operation (i.e., a normal HARQ operation). In LTE (-A) TDD, the number of UL SFs varies with UL-DL configurations, and thus the number of UL HARQ processes and an HARQ round trip time (RTT) are also different according to a UL-DL configuration. The HARQ RTT may refer to a time interval (e.g., in SFs or ms) from the reception time of a UL grant through the transmission time of a PUSCH (corresponding to the UL grant) to the reception time of a PHICH (corresponding to the PUSCH) or from the PUSCH transmission time to a corresponding retransmission time. When subframe bundling is applied, a PUSCH transmission is performed in a bundle of four consecutive UL SFs in FDD and TDD. Accordingly, when subframe bundling is applied, an HARQ operation/process is performed in a different manner from the above-described normal HARQ operation/process.

Table 9 lists the maximum number of DL HARQ processes for each UL-DL configuration in TDD.

TABLE 9

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

In TDD, since the number of UL SFs is different according to a UL-DL configuration, the number of UL HARQ processes and an HARQ RTT are also configured differently in each UL-DL configuration. An HARQ RTT may be a time interval (e.g., in SFs or ms) from a UL grant reception time through a (corresponding) PUSCH transmission to a (corresponding) PHICH reception time or from a PUSCH transmission time to a corresponding retransmission time.

Table 10 lists the numbers of synchronous UL HARQ processes and HARQ RTTs in TDD. When a UL HARQ RTT is 10 [SFs or ms] (UL-DL configurations #1, #2, #3, #4, and #5), one UL HARQ process uses one fixed UL SF timing. On the other hand, when the UL HARQ RTT is not 10 [SFs or ms] (UL-DL configurations #0 and #6), one UL HARQ process uses a plurality of UL SF timings (by hoping) (instead of one fixed UL SF timing). For example, in UL-DL configuration #6, PUSCH transmission timings in one UL HARQ process may be given as follows: SF #2: PUSCH=>SF #13: PUSCH (RTT: 11 SFs)=>SF #24: PUSCH (RTT: 11 SFs)=>SF #37: PUSCH (RTT: 13 SFs) =>SF #48: PUSCH (RTT: 11 SFs)=>SF #52: PUSCH (RTT: 14 SFs).

TABLE 10

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

HARQ Procedure for MR-DC

The 3GPP standardization group has been working on standardization of a 5G wireless communication system called new radio access technology (NR). The 3GPP NR system has been designed to support a plurality of logical networks in a single physical system and provide services with various requirements (e.g., eMBB, mMTC, URLLC, and so on) by changing a transmission time interval (TTI) and an OFDM numerology (e.g., an OFDM symbol duration, a subcarrier spacing (SCS), and so on). Further, the 3GPP NR system has been designed to support an operation of providing various services to a single UE through a plurality of different radio access technologies (RATs) (an eNB being a BS operating in the LTE system and a gNB being a BS operating in the NR system) by simultaneously configuring the legacy LTE system and the NR system for the UE in the form of multiple RAT dual connectivity or multi-radio dual connectivity (MR-DC). RATs refer to physical access technologies for wireless communication technologies, including Bluetooth, IEEE 802.11 (Wi-Fi), IEEE 802.16 (WiMAX), IEEE 802-20, LTE, LTE-A, and NR.

In the MR-DC situation as described above, it may be impossible to simultaneously perform UL transmissions through both RATs at the same time due to the difference in technical specifications between LTE and NR and UE hardware characteristics. Accordingly, a UE operation may need to be defined to perform a UL transmission only through one of the two RATs at one time point based on a specific rule. More specifically, it may be necessary to appropriately divide a UL transmission time between the two RATs, so that an LTE UL time and an NR UL time are configured in TDM. As an approach to this scheme, a UL-DL configuration (referred to as a "DL-reference (DL-ref)" configuration) different from an original UL-DL configuration (referred to as an "SIB configuration") configured for an LTE (TDD) cell by a system information block (SIB) may be additionally configured, and a UL HARQ-ACK feedback for a PDSCH reception may be transmitted at a DL HARQ timing defined in the DL-ref configuration (e.g., configuring fewer UL SFs than the SIB configuration). For example, the DL-ref configuration may be a UL-DL configuration corresponding to a UL-subset of the SIB configuration. In this case, the UE is allowed/indicated/configured to perform a UL transmission only at a time configured as a UL subframe in the LTE cell by the DL-ref configuration, and at a time other than the UL subframes of the DL-ref configuration in an NR cell. The DL-ref configuration may also be referred to as a DL-ref UL-DL configuration.

In this regard, the present disclosure proposes a method of determining a UL HARQ timing (a UL grant PDCCH-to-PUSCH time delay) for PUSCH scheduling/transmission in an LTE (TDD) cell, when a DL-ref configuration is configured for the LTE (TDD) cell, and a PDSCH HARQ timing is applied and an HARQ-ACK feedback transmission is performed based on the DL-ref configuration, as in an MR-DC situation. An LTE cell may refer to a primary cell (PCell) configured for a UE from an LTE cell group, and a situation in which this LTE PCell operates in TDD is specifically considered. The proposed method is not applied restrictively only to the MR-DC situation of LTE and NR, and the same operation principle may be applied even to a DC situation between a plurality of RATs or a plurality of BSs in the same RAT. The term HARQ-ACK feedback may be interchangeably used with HARQ-ACK, HARQ-ACK response, HARQ response, HARQ-ACK information, and HARQ information.

Figure 14:
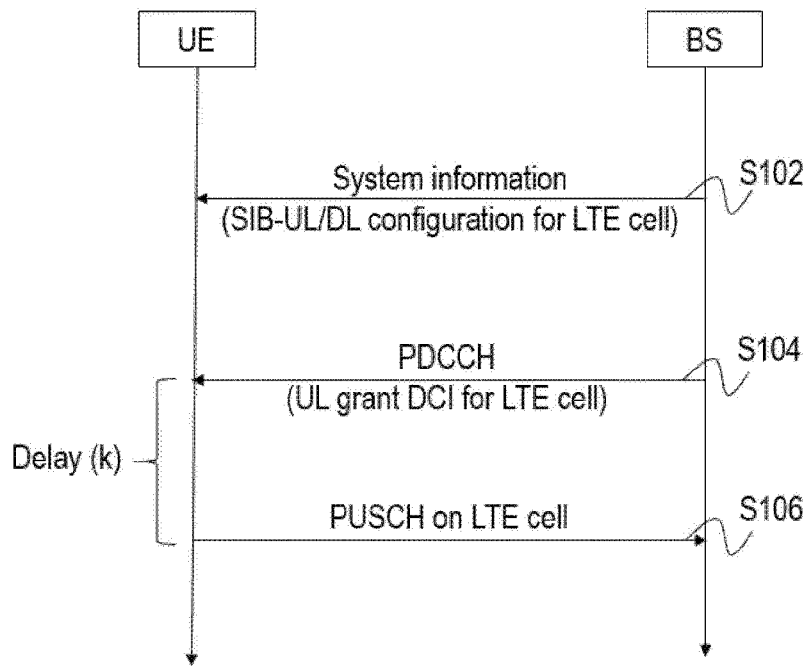

FIG. 14 illustrates an exemplary UL transmission process according to an example of the present disclosure. Referring to FIG. 14, a UE may receive system information including information about a UL-DL configuration from a BS (S102). The UL-DL configuration indicated by the system information may be referred to as an SIB-UL-DL configuration or an SIB configuration. The SIB-UL-DL configuration may be indicated as one of a plurality of predefined UL-DL configurations. For example, the plurality of predefined UL-DL configurations may be the TDD UL-DL configurations illustrated in Table 2 or a sub-set of the TDD UL-DL configurations. The UE may then receive a PDCCH including UL scheduling information (e.g., UL grant DCI) for an LTE cell in SF #n (S104) and transmit a PUSCH corresponding to the PDCCH in SF #(n+k) of the LTE cell (S106). Herein, k is a UL HARQ timing (a UL grant PDCCH-to-PUSCH time delay). In DC between a plurality of RATs or between a plurality of BSs in the same RAT, the UL HARQ timing may be determined according to the proposed method of the present disclosure. FIG. 14 illustrates LTE as an RAT. LTE may be generalized as a first RAT in FIG. 14. Further, FIG. 14 may be applied to a case in which a DL-ref configuration is configured for an LTE (TDD) cell, and a PDSCH HARQ timing is applied and an HARQ-ACK feedback transmission is performed based on the DL-ref configuration in an MR-DC situation. In this case, the UE may be allowed/indicated/configured to perform a UL transmission only at a time configured as a UL subframe by the DL-ref configuration in the LTE cell (the first RAT/BS), and at a time other than the UL subframes configured by the DL-ref configuration in an NR cell (a second RAT/BS).

Case in which SIB-UL-DL Configuration for LTE Cell is UL-DL Configuration 1/2/3/4/5

When one of UL-DL configurations 1, 2, 3, 4 and 5 is configured as an SIB-UL-DL configuration for an LTE cell, an HARQ RTT determined according to a UL HARQ timing defined in the UL-DL configuration is the periodicity of a UL-DL SF pattern, 10 ms (=10 SFs). As described before, an HARQ RTT may mean a time delay between a previous PUSCH transmission and the next PUSCH retransmission. That is, a retransmission PUSCH for a PUSCH transmission in a specific UL SF, SF #A is transmitted in the same UL SF, SF #A (10 ms later). Even though the UL SFs of the LTE cell are limited to the UL SFs of a DL-ref configuration, this HARQ RTT (a PUSCH retransmission latency or a time delay between a previous PUSCH transmission and the next retransmission PUSCH) may not be affected at all. Therefore, when one of UL-DL configurations 1, 2, 3, 4 and 5 is configured as the SIB-UL-DL configuration of the LTE cell and a specific DL-ref configuration is configured for the LTE cell, the UL HARQ timing defined in the SIB-UL-DL configuration may still be applied to PUSCH scheduling/transmission in the LTE cell.

Case in which SIB-UL-DL Configuration of LTE Cell is UL-DL Configuration 0/6

When one of UL-DL configurations 0 and 6 is configured as an SIB-UL-DL configuration for an LTE cell, an HARQ RTT determined according to a UL HARQ timing defined in the UL-DL configuration is a value (e.g., 11 ms (SFs) or 13 ms (SFs)) different from the UL/DL SF pattern periodicity, 10 ms (=10 SFs). That is, a retransmission PUSCH for a PUSCH transmission in a specific UL SF, SF #A is transmitted in another UL SF, SF #B ((10+X) ms later). More specifically, a PUSCH is retransmitted in a UL SF with a changed index (at each transmission). When the UL SF with the changed index for the PUSCH retransmission is not a UL SF of the DL-ref configuration, the UE may need to wait until the next HARQ timing to transmit the PUSCH. Therefore, in the case where the SIB-UL-DL configuration of the LTE cell is UL-DL configuration 0/6, the HARQ RTT may be increased relatively significantly, when the UL SFs of the LTE cell are limited to the UL SFs of the DL-ref configuration.

Therefore, when one of UL-DL configurations 0 and 6 is configured as an SIB-UL-DL configuration for an LTE cell and a specific DL-ref configuration is configured for the LTE cell, a UL HARQ timing defined in a specific UL-DL configuration other than the SIB-UL-DL configuration may be applied to PUSCH scheduling/transmission in the LTE cell. The other UL-DL configuration may have a UL HARQ RTT of 10 ms (10 SFs). The other specific UL-DL configuration may be referred to as a UL reference (UL-ref) configuration. According to the UL-ref configuration, the UL HARQ RTT of 10 ms (10 SFs) may be applied to the PUSCH scheduling/transmission in the LTE cell (see Table 2 and Table 6).

In a specific example, the UL-ref configuration may be UL-DL configuration 1. A UL HARQ timing for a PUSCH transmission in UL SF #2/3/7 defined in UL-ref configuration 1 may be applied to PUSCH scheduling/transmission (in UL SF #2/3/7) in the LTE cell. And/or the UL-ref configuration may be UL-DL configuration 3. A UL HARQ timing for a PUSCH transmission in UL SF #4 defined in UL-ref configuration 3 may be applied to PUSCH scheduling/transmission (in UL SF #4) in the LTE cell. When a specific UL SF index in the DL-ref configuration is not one of UL SF index 1/3/7 and/or 4, the PUSCH transmission in the corresponding UL SF may not be supported/indicated/allowed. More specifically, when the SIB-UL-DL configuration is UL-DL configuration 0/6, the following methods may be considered by combining an available DL-ref configuration and a UL-ref configuration suitable for the DL-ref configuration (see Table 2 and Table 6).

First, the DL-ref configuration may be limited to UL-DL configuration 2/4/5. In this case, the UL-ref configuration may be UL-DL configuration 1. A UL HARQ timing for a PUSCH transmission in UL SF #2/3/7 (in the DL-ref configuration) defined in UL-ref configuration 1 may be applied. The UL HARQ timing for a PUSCH transmission in UL SF #2/3/7 (in the DL-ref configuration) defined in UL-ref configuration 1 may be referred to as a UL-ref-1 timing. When the SIB-UL-DL configuration is UL-DL configuration 0, 1) a PUSCH transmission in UL SF #3 may not be supported/indicated/allowed, or 2) the DL-ref configuration may be limited to UL-DL configuration 2/5.

Alternatively, the DL-ref configuration may be limited to UL-DL configuration 2/3/4/5. In this case, the UL-ref-1 timing may be applied, and UL/DL configuration 3 may be an additional UL-ref configuration. A UL HARQ timing for a PUSCH transmission in UL SF #4 defined in UL-ref configuration 3 may be applied. The UL HARQ timing for a PUSCH transmission in UL SF #4 defined in UL-ref configuration 3 may be referred to as a UL-ref-3 timing. When the SIB-UL/DL configuration is UL-DL configuration 0, 1) a PUSCH transmission in UL SF #3 may not supported/indicated/allowed, or 2) the DL-ref configuration may be limited to UL/DL configuration 2/5.

Alternatively, the DL-ref configuration may be limited to UL-DL configuration 1/2/4/5. In this case, the UL-ref-1 timing may be applied, and a PUSCH transmission in UL SF

8 may not be supported/indicated/allowed. When the SIB-UL-DL configuration is UL-DL configuration 0, 1) a PUSCH transmission in UL SF #3 may not be supported/indicated/allowed, or 2) the DL-ref configuration may be limited to UL-DL configuration 2/5.

Alternatively, the DL-ref configuration may be limited to UL-DL configuration 1/2/3/4/5. In this case, the UL-ref-1 timing and the UL-ref-3 timing may be applied, and a PUSCH transmission in UL SF #8 may not be supported/indicated/allowed. When the SIB-UL-DL configuration is UL-DL configuration 0, 1) a PUSCH transmission in UL SF #3 may not be supported/indicated/allowed, or 2) the DL-ref configuration may be limited to UL-DL configuration 2/5.

Additional Proposed Method

In an MR-DC situation, when one of UL-DL configurations 1/2/3/4/5 is configured as an SIB-UL-DL configuration for an LTE cell and a specific DL-ref configuration is configured for the LTE cell, a UL HARQ timing defined in the SIB-UL-DL configuration may be applied to PUSCH scheduling/transmission in the LTE cell. In addition, a PHICH may be detected and/or received at a specific DL SF time (configured as a PHICH transmission timing) determined according to the applied UL HARQ timing (as is done conventionally). The PHICH detection and/or reception at the specific DL SF time may be reflected in and/or applied to a PUSCH retransmission.

In the MR-DC situation, when one of UL-DL configurations 0/6 is configured as an SIB-UL-DL configuration for an LTE cell and a specific DL-ref configuration is configured for the LTE cell, a UL HARQ timing defined in the SIB-UL-DL configuration may be applied to PUSCH scheduling/transmission in the LTE cell. In addition, a PHICH may not be detected and/or received at a specific DL SF time (configured as a PHICH transmission timing) determined according to the applied UL HARQ timing (compared to the conventional case). Because the PHICH is not received, the UE may perform a PUSCH retransmission by detecting and/or receiving UL grant DCI (without referring to the PHICH).

Alternatively, the operation of retransmitting a PUSCH by detecting and/or receiving UL grant DCI without PHICH detection and/or reception may be applied only to and/or performed only at a specific DL time. The specific DL SF time may be an SF time configured as a PHICH transmission timing corresponding to a PUSCH transmission in a UL SF other than UL SFs defined by the DL-ref configuration. An SF other than the UL SFs defined by the DL-ref configuration may be referred to as a non-ref UL SF. For a DL SF time configured as a PHICH transmission timing corresponding to a PUSCH transmission in a UL SF defined by the DL-ref configuration, the PHICH detection and/or reception may be reflected in and/or applied to a PUSCH retransmission (as is done conventionally). The operation described in this paragraph may be applied only when the SIB-UL-DL configuration is UL-DL configuration 0/6. The operation of skipping PHICH detection and/or reception may be performed in the same manner even when an ACK is assumed and/or considered without PHICH reception. The PHICH transmission timing corresponding to the PUSCH transmission in the UL SF other than the UL SFs defined by the DL-ref configuration may be, for example, a transmission timing of a PHICH indicating a PUSCH (re) transmission in a non-ref UL SF before the non-ref UL SF.

The above operation may be more generalized as follows. In the MR-DC situation, when a specific DL-ref configuration is configured for an LTE cell operating in FDD or for an LTE cell operating in TDD and having any UL-DL configuration as a specific DL-ref configuration, 1) PHICH detection and/or reception may be skipped at a specific DL time configured as a PHICH transmission timing corresponding to a PUSCH transmission in a UL SF other than UL SFs defined in the DL-ref configuration. And/or a PUSCH may be retransmitted by detection and/or reception of UL grant DCI. In addition, in the MR-DC situation, when a specific DL-ref configuration is configured for an LTE cell operating in FDD or for an LTE cell operating in TDD and having any UL-DL configuration as a specific DL-ref configuration, 2) PHICH detection and/or reception may be reflected in and/or applied to a PUSCH retransmission at a specific DL time configured as a PHICH transmission timing corresponding to a PUSCH transmission in a UL SF other than UL SFs defined in the DL-ref configuration (as is done conventionally). Any UL-DL configuration may include, for example, UL-DL configuration 0/1/2/3/4/5/6. The operation of skipping PHIC detection and/or reception may be performed in the same manner even when an ACK is assumed and/or considered without PHICH reception. The PHICH transmission timing corresponding to the PUSCH transmission in the UL SF other than the UL SFs defined in the DL-ref configuration may be, for example, a transmission timing of a PHICH indicating a PUSCH (re) transmission in a non-ref UL SF before the non-ref UL SF.

For a PUSCH transmission in a UL SF other than the UL SFs defined in the DL-ref configuration, the UE is not allowed to automatically retransmit the PUSCH based on the PHICH, which may prevent collision between an LTE PUSCH transmission and an NR PUSCH transmission (e.g., in the non-ref UL SF).

Alternatively, in the case where detection and/or reception of a PHICH for an LTE PUSCH transmission and a retransmission based on the PHICH detection and/or reception are allowed in any UL SF (or non-ref UL SF), when an LTE PUSCH transmission collides with an NR PUSC transmission in the non-ref UL SF, only the NR PUSCH transmission may be performed, while the LTE PUSCH transmission is dropped. Further, in the case where an LTE PUSCH transmission in a non-ref UL SF is indicated by UL grant DCI, when the LTE PUSCH transmission collides with an NR PUSCH transmission in the non-ref UL SF, only the LTE PUSCH transmission may be performed, while the NR PUSCH transmission is dropped.

Alternatively, in the case where an LTE PUSCH transmission in a non-ref UL SF is indicated through detection and/or reception of a PHICH, when the LTE PUSCH transmission collides with an NR PUSCH transmission in the non-ref UL SF, only the NR PUSCH transmission may be performed, while the LTE PUSCH transmission is dropped. Further, in the case where an LTE PUSCH transmission in a non-ref UL SF is indicated by UL grant DCI, when the LTE PUSCH transmission collides with an NR PUSCH transmission in the non-ref UL SF, only the LTE PUSCH transmission may be performed, while the NR PUSCH transmission is dropped.

Alternatively, in the case where an LTE PUSCH transmission collides with an NR PUSCH transmission in a non-ref UL SF, when the LTE PUSCH is scheduled to be transmitted in an LTE PCell, only the LTE PUSCH transmission may be performed, while the NR PUSCH transmission is dropped. In the case where a plurality of LTE PUSCH transmissions are indicated, when at least one of the indicated LTE PUSCH transmissions is scheduled in the LTE PCell, only the LTE PUSCH transmission may be performed, while the NR PUSCH transmission is dropped. Further, in the case where an LTE PUSCH transmission collides with an NR PUSCH transmission in a non-ref UL SF, when the LTE PUSCH is scheduled to be transmitted in a secondary cell (SCell), only the NR PUSCH transmission may be performed, while the LTE PUSCH transmission is dropped. In the case where a plurality of LTE PUSCH transmissions are indicated, when all of the indicated LTE PUSCH transmissions are scheduled to be transmitted in the LTE SCell, only the NR PUSCH transmission may be performed, while the LTE PUSCH transmissions are dropped.

Alternatively, in the case where an LTE PUSCH transmission collides with an NR PUSCH transmission in a non-ref UL SF, when the LTE PUSCH is scheduled by DCI transmitted in a common PDCCH search space, only the LTE PUSCH transmission may be performed, while the NR PUSCH transmission is dropped. In the case where a plurality of LTE PUSCH transmissions are indicated, when at least one of the indicated LTE PUSCH transmission is scheduled by DCI transmitted in a common PDCCH search space, only the LTE PUSCH transmission may be performed, while the NR PUSCH transmission is dropped. Further, in the case where an LTE PUSCH transmission collides with an NR PUSCH transmission in a non-ref UL SF, when the LTE PUSCH is scheduled by DCI transmitted in a UE-specific PDCCH search space, only the NR PUSCH transmission may be performed, while the LTE PUSCH transmission is dropped. In the case where a plurality of LTE PUSCH transmissions are indicated, when all of the indicated LTE PUSCH transmissions are scheduled by DCI transmitted in a UE-specific PDCCH search space, only the NR PUSCH transmission may be performed, while the LTE PUSCH transmissions are dropped.

Method of Transmitting HARQ-ACK Feedback for DL PDSCH Reception

In a legacy TDD LTE system (supporting carrier aggregation), an HARQ-ACK feedback for a DL PDSCH reception may be transmitted in the following methods. In the following description, a PUCCH format may refer to a PUCCH format defined in the 3GPP LTE standards. Table 11 lists UCI for each PUCCH format defined in the 3GPP LTE standards.

TABLE 11

| PUCCH format | Uplink control information (UCI) |
| --- | --- |
| Format 1 | Scheduling Request (SR) (non-modulated waveform) |
| Format 1a | 1-bit HARQ ACK/NACK (with/without SR) |
| Format 1b | 2-bit HARQ ACK/NACK (with/without SR) |
| Format 2 | CSI (20 coded bits) |
| Format 2 | CSI and 1-bit or 2-bit HARQ ACK/NACK (20 bits) (only for extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | up to 24-bit HARQ ACK/NACK + SR |

Additionally, PUCCH format 3 may be used to convey CSI in addition to an HARQ ACK/NACK and an SR. Like PUCCH format 3, PUCCH formats 4 and 5 may be used to transmit an HARQ ACK/NACK, an SR, and CSI.

In the present disclosure, time, frequency, and/or code resources used to transmit a PUCCH may be referred to as PUCCH resources. For example, an orthogonal code index, a cyclic shift index, and an RB index are required for PUCCH format 1/1a/1b. For PUCCH format 2/2a/2b, a cyclic shift index and an RB index are required. A resource index is a parameter used to determine a corresponding PUCCH resource.

DL grant DCI that schedules a PDSCH may be configured differently depending on whether the DL grant DCI is i) DCI that schedules a PCell and conveys an initial downlink assignment index (DAI) value or ii) DCI that schedules a PCell and conveys a value other than the initial DAI value or DCI that schedules an SCell. The value other than the initial DAI value may be, for example, a DAI value after DAI=1. The DCI that schedules a PCell and conveys an initial DAI value may be referred to as fallback-DCI. The DCI that schedules a PCell and conveys a value other than the initial DAI value and the DCI that schedules an SCell may be referred to as non-fallback-DCI. A transmission power control (TPC) command applied to actual PUCCH transmission power control is indicated by a TPC field of the fall-back DCI. An ACK/NACK resource indicator (ARI) indicating one of a plurality of PUCCH format 3/4/5 resources is included in a TPC field of the non-fallback-DCI.

A DCI detection and/or reception-based HARQ-ACK feedback transmission operation may be performed in a different manner, depending on whether the UE receives only fallback DCI (a fallback case) or non-fall-back DCI (a non-fallback case). In the fallback case, the UE transmits only an HARQ-ACK response for a DCI-based PDSCH reception in a PUCCH format 1a and/or 1b resource corresponding to a CCE index used for a PDCCH transmission conveying DCI. The PUCCH format 1a and/or 1b resource may be determined implicitly to be, for example, a resource corresponding to a lowest CCE index. In the non-fallback case, the UE transmits a multi-bit HARQ-ACK feedback including a plurality of HARQ-ACK responses for a plurality of PDSCH receptions in PUCCH format 3, 4, and/or 5 resources indicated by an ARI in DCI.

When a specific DL-ref configuration is configured for an LTE cell operating in TDD in the MR-DC situation, CCE index-to-PUCCH resource index mapping may be applied to a UE configured with MR-DC according to an HARQ-ACK timeline defined in the DL-ref configuration (in the fallback case). As described before, the specific DL-ref configuration may be a UL-DL configuration different from an SIB-UL-DL configuration. In the legacy system, CCE index-to-PUCCH resource index mapping is applied to a UE according to an HARQ-ACK timeline defined in the SIB-UL-DL configuration, and thus an implicit PUCCH format 1a and/or 1b resource is determined. Therefore, when the UE configured with MR-DC is placed in the fallback case, supporting and/or allowing use of an implicit PUCCH format 1a and/or 1b resource for an HARQ-ACK transmission may be limited or may be hard to be implemented in terms of PDSCH scheduling of a BS (or eNB). When the UE configured with MR-DC is placed in the fallback case, the following HARQ-ACK feedback transmission method may be performed, in terms of DL PDSCH scheduling of the BS (or eNB).

In the case where a single (explicit) PUCCH format 1a and/or 1b resource is preconfigured by RRC signaling, upon occurrence of the fallback case, an HARQ-ACK feedback for a PDSCH corresponding to fallback DCI may be transmitted in the configured resource. The single PUCCH format 1a and/or 1b resource preconfigured by RRC signaling corresponds to an explicitly configured resource rather than an implicitly determined resource. (Method 1-1)

Alternatively, in the case where a plurality of (explicit) PUCCH format 1a and/or 1b resources are preconfigured by RRC signaling, upon occurrence of the fallback case, one of the configured resources may be determined as an HARQ- ACK feedback transmission resource according to a specific CCE index value used for a PDCCH transmission carrying fallback DCI. For example, with the plurality of configured PUCCH resources indexed, a value calculated by applying a modulo operation to the specific CCE index is determined as a PUCCH resource in which an HARQ-ACK feedback is transmitted. The specific CCE index may be, for example, a lowest CCE index. The UE may transmit the HARQ-ACK feedback for the PDSCH corresponding to the fallback DCI in the determined PUCCH resource. (Method 1-2)

Alternatively, even though the fallback case occurs, an HARQ-ACK feedback may be transmitted in a specific one PUCCH resource among a plurality of PUCCH format 3, 4, and/or 5 resources. The plurality of PUCCH format 3, 4, and/or 5 resources may be preconfigured by RRC signaling. The specific one PUCCH resource may correspond to, for example, a specific ARI state. (Method 2-1).

Alternatively, even though the fallback case occurs, one of a plurality of PUCCH format 3, 4, and/or 5 resources may be determined to be a resource for transmission of an HARQ-ACK feedback according to a specific CCE index used to transmit a PDCCH carrying fallback DCI. For example, a PUCCH resource configured for an ARI state index corresponding to a value calculated by applying a modulo operation to the specific CCE index may be determined to be the PUCCH resource for transmission of the HARQ-ACK feedback. The specific CCE index may be, for example, a lowest CCE index. The UE may transmit the HARQ-ACK feedback for a PDSCH corresponding to the fallback DCI in the determined PUCCH resource. (Method 2-2).

Additionally, an HARQ-ACK transmission for an SPS PDSCH reception may be configured at the transmission timing of an HARQ-ACK feedback corresponding to the fallback case. In other words, the HARQ-ACK feedback transmission timing corresponding to the fallback case and the HARQ-ACK transmission timing for the SPS PDSCH reception may be configured in the same SF. When the HARQ-ACK transmission for the SPS PDSCH reception is configured at the time of the HARQ-ACK feedback transmission corresponding to the fallback case, it may be referred to as a fallback+SPS case. In the fallback+SPS case, an HARQ-ACK feedback may be transmitted in one of a plurality of PUCCH format 3, 4 and/or 5 resources. The HARQ-ACK feedback transmission in the one of the plurality of PUCCH format 3, 4 and/or 5 resources may be performed, for example, in method 2-1 and/or method 2-2. In a case other than the fallback+SPS case, an HARQ-ACK feedback may be transmitted in one of PUCCH format 1a and/or 1b resources. The HARQ-ACK feedback transmission in one of the PUCCH format 1a and/or 1b resources may be performed, for example, in method 1-1 and/or method 1-2.

When the UE (MR-DC UE) configured with and/or operating in MR-DC transmits an HARQ-ACK feedback in one of a plurality of PUCCH formats 3, 4 and/or 5 resources in the fallback case, a periodic CSI report and/or an SR transmission may be configured at the transmission timing of an HARQ-ACK feedback. In other words, the SF time of the HARQ-ACK feedback transmission in the one of the plurality of PUCCH format 3, 4 and/or 5 resources in the fallback case may be identical to an SF time at which the periodic CSI report and/or the SR transmission are configured. A legacy LTE UE (or UE capable of an MR-DC operation but connected only to LTE) simultaneously transmits an HARQ-ACK and periodic CSI in PUCCH format 2a/2b and/or simultaneously transmits an HARQ-ACK and a (positive) SR in PUCCH format 1a/1b. However, since the MR-DC UE may use PUCCH format 3, 4 and/or 5 resources even in the fallback case, a more stable/efficient UCI transmission may be implemented. The HARQ-ACK feedback transmission in the one of the plurality of PUCCH format 3, 4 and/or 5 resources may be performed, for example, in method 2-1 and/or method 2-2.

More specifically, in the case where the MR-DC UE transmits an HARQ-ACK feedback in a PUCCH format 3, 4, and 5 resource in the fallback case and/or the fallback+SPS case (and/or the case where only an HARQ-ACK feedback transmission corresponding to an SPS PDSCH is required), when a periodic CSI transmission and/or an SR transmission is configured at the transmission timing of an HARQ-ACK feedback, the MR-DC UE may simultaneously transmit the HARQ-ACK and the periodic CSI and/or the SR in one of PUCCH format 3, 4 and/or 5 resources. The HARQ-ACK feedback transmission in the one of the plurality of PUCCH format 3, 4 and/or 5 resources may be performed, for example, in method 2-1 and/or method 2-2.

Figure 15:
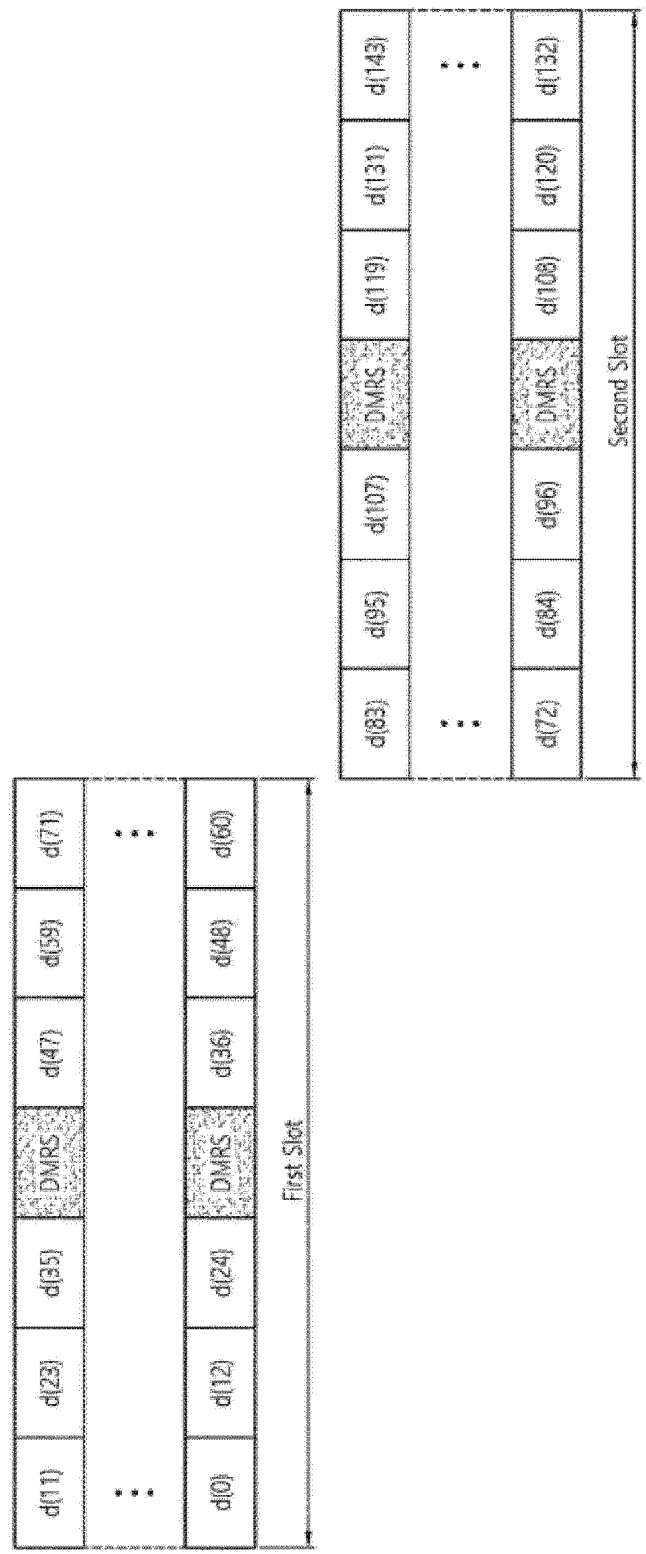

FIG. 15 illustrates an exemplary channel structure for PUCCH format 3.

One slot includes 7 OFDM symbols, the second and sixth OFDM symbols are used for a DMRS, and the remaining five OFDM symbols are used for UCI. PUCCH format 3 may carry 24 data symbols d (0) to d (23). When QPSK is used, PUCCH format 3 may carry 48 encoded bits.

In a first slot, first 12 data symbols d (0) to d (11) are spread with an orthogonal code W (j)={w (0), w (1), w (2), w (3), w (4)} in the time domain. The time-domain spreading involves w (i) corresponding to each OFDM symbol in the slot. In a second slot, second 12 data symbols d (12) to d (23) are spread with the orthogonal code W (j) in the time domain.

When the MR-DC UE transmits an HARQ-ACK feedback and CSI and/or an SR together in one of the PUCCH format 3 resources, for example, the channel structure illustrated in FIG. 15 may be used.

Implementation Example

Embodiments may be implemented by organically combining one or more of the operations described above.

Figure 16:
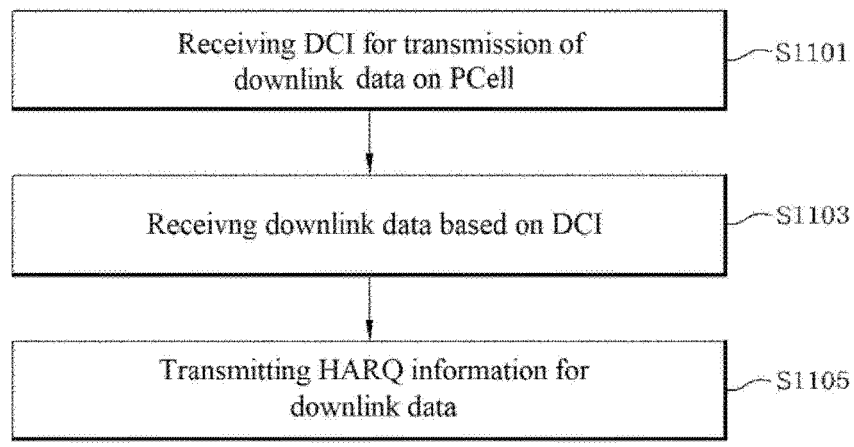

One of the embodiments that may be implemented by a combination of the above-described operations may be illustrated in FIG. 16.

Referring to FIG. 16, embodiments of the present disclosure may be performed by a communication device (e.g., a UE) including a UE, and may include receiving DCI for a DL data transmission on a PCell (S1101), receiving DL data based on the DCI (S1103), and transmitting HARQ information for the DL data (S1103).

The DCI may include a DAI having a value of 1.

When a CSI transmission and/or an SR transmission is configured in an SF carrying the HARQ information, (i) the HARQ information and (ii) CSI and/or an SR may be transmitted together in the configured SF. When a transmission of second HARQ information for an SPS PDSCH reception is configured in the SF carrying the HARQ information, (i) the HARQ information and (iii) the second HARQ information may be transmitted together in the configured SF.

When a CSI transmission and/or an SR transmission is configured in the SF carrying the HARQ information, and when MR-DC is configured for the UE, (i) the HARQ information and (ii) CSI and/or an SR may be transmitted in a resource related to PUCCH format 3. When MR-DC is not configured for the UE, (i) the HARQ information and (ii) the CSI and/or the SR may be transmitted in a resource related to PUCCH format 1a, 1b, 2a, and/or 2c. When a transmission of second HARQ information for an SPS PDSCH reception is configured in the SF carrying the HARQ information, and when MR-DC is configured for the UE, (i) the HARQ information and (ii) the second HARQ information may be transmitted in a resource related to PUCCH format 3.

In addition, when MR-DC is configured for the UE, UL-DL configurations available as a DL-ref configuration may be determined based on an SIB-UL-DL configuration. When the SIB-UL-DL configuration is UL-DL configuration 1, 2, 3, 4 and/or 5, the UL-DL configurations available as the DL-ref configuration may include all UL-DL configurations 0 to 6. When the SIB-UL-DL configuration is UL-DL configuration 0 and/or 6 (as described in 'case in which SIB-UL-DL configuration of LTE cell is UL-DL configuration 0/6'), the UL-DL configurations available as the DL-ref configuration may be, for example, {2, 4, 5} among the UL-DL configurations. Alternatively, when the SIB-UL-DL configuration is UL-DL configuration 0 and/or 6, the UL-DL configurations available as the DL-ref configuration may be, for example, {2, 3, 4, 5}, {2, 4, 5}, or {2, 3, 4, 5}.

Further, a UL-ref configuration for a UL data transmission may be configured based on the UL-DL configurations available as the DL-ref configuration. When the SIB-UL-DL configuration is UL-DL configuration 1, 2, 3, 4 and/or 5, the UL-ref configuration may not be separately configured. When the SIB-UL-DL configuration is UL-DL configuration 0 and/or 6 (as described in 'case in which SIB-UL-DL configuration of LTE cell is UL-DL configuration 0/6'), the UL-ref configuration may be, for example, UL-DL configuration 1 and/or 3. In addition, only a PUSCH transmission in some of UL SFs configured in UL-DL configuration 1 and/or 3 may be supported, indicated, and/or allowed.

One or more of the operations described before FIG. 16 may be additionally performed in combination with the operation of FIG. 16 described above.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 17:
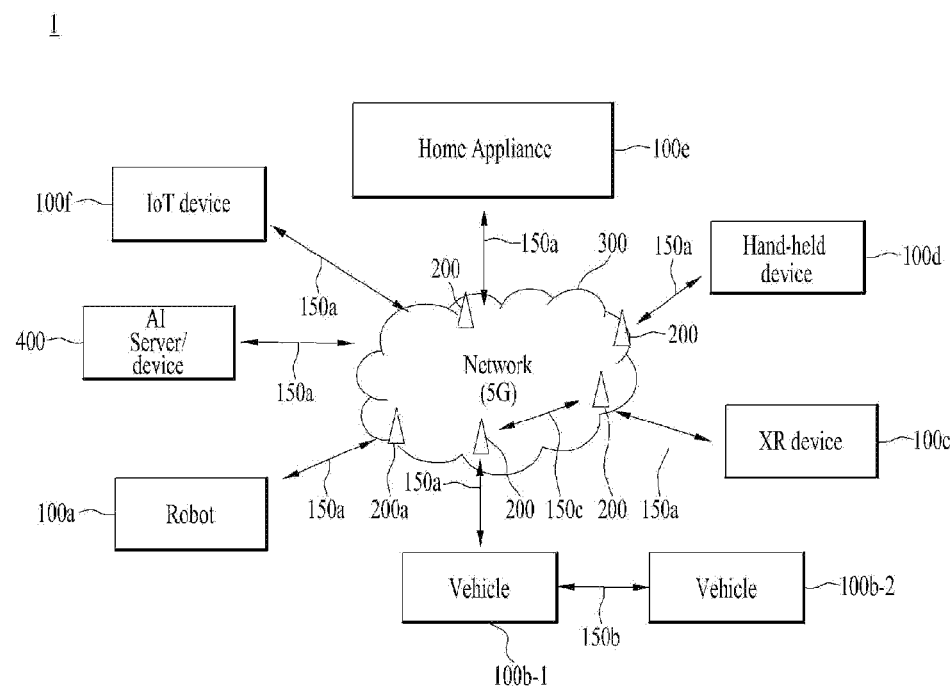
FIGS. 17 to 20 illustrate devices according to an embodiment of the present disclosure.

FIG. 17 illustrates a communication system 1 applied to the present disclosure.

Referring to FIG. 17, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 18:
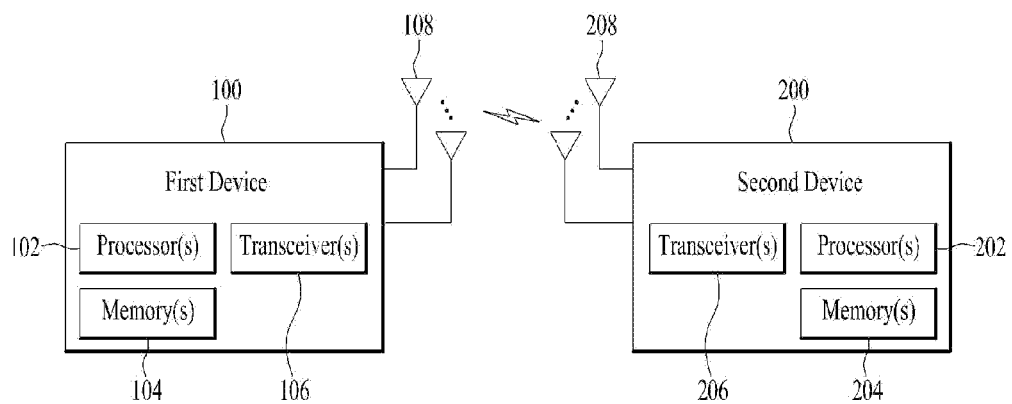

FIG. 18 illustrates wireless devices applicable to the present disclosure.

Referring to FIG. 18, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 19:
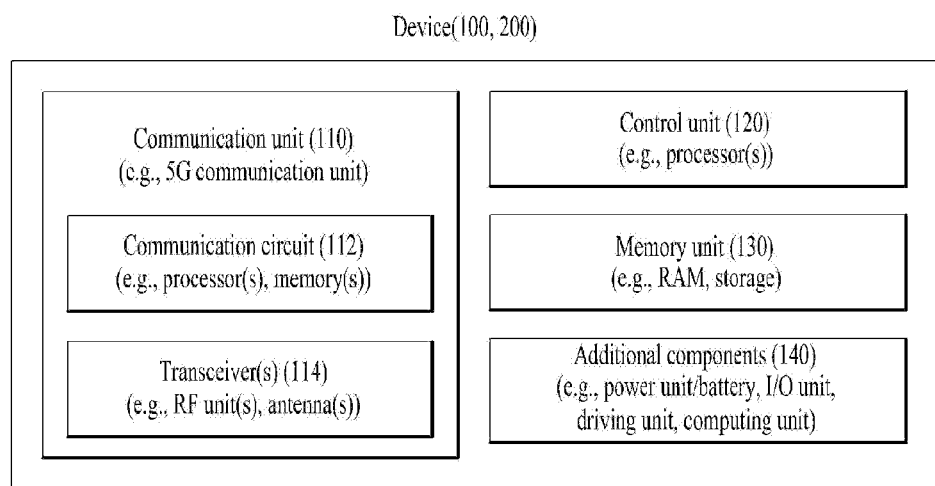

FIG. 19 illustrates another example of a wireless device applied to the present disclosure. The wireless device may be implemented in various forms according to a use case/service (refer to FIG. 17).

Referring to FIG. 19, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 17), the vehicles (100b-1 and 100b-2 of FIG. 17), the XR device (100c of FIG. 17), the hand-held device (100d of FIG. 17), the home appliance (100e of FIG. 17), the IoT device (100f of FIG. 17), a digital broadcasting terminal, a hologram device, a public safety device, an MTC device, a medical device, a FinTech device (or a finance device), a security device, a climate/environment device, the AI server/device (400 of FIG. 17), the BSs (200 of FIG. 17), a network node, or the like. The wireless device may be mobile or fixed according to a use case/service.

In FIG. 19, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 20:
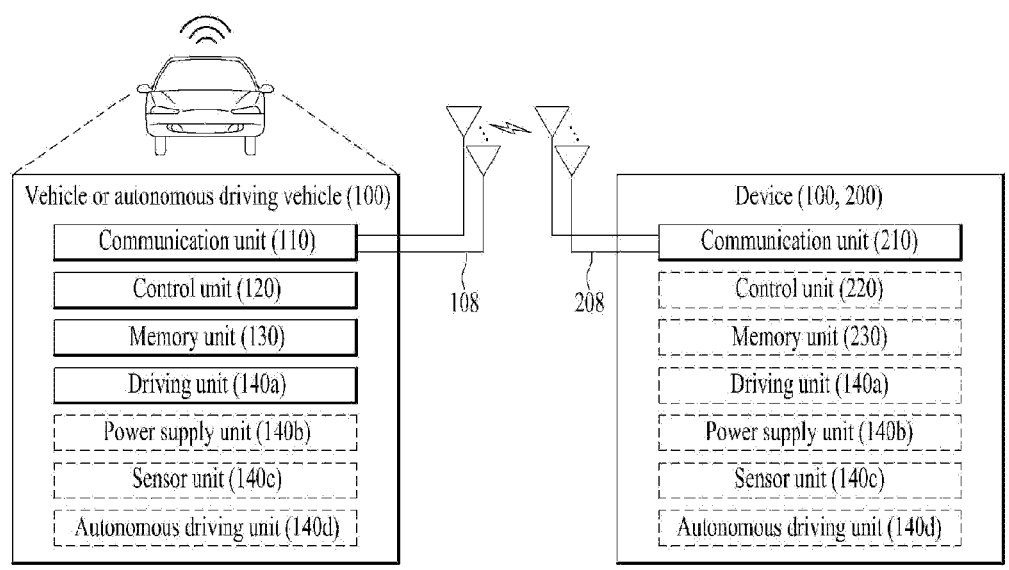

Example of Vehicle or Autonomous Driving Vehicle to which the Present Disclosure is Applied FIG. 20 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 20, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal, performed by a user equipment (UE), in a wireless communication system, the method comprising:
    receiving downlink data on a primary cell (PCell), wherein a value of a downlink assignment index (DAI) included in Downlink Control Information (DCI) for scheduling the downlink data is 1; and
    transmitting hybrid automatic repeat request (HARQ) information for the downlink data,
    wherein based on a scheduling request (SR) transmission being configured in a subframe in which the HARQ information is transmitted, (i) the HARQ information and (ii) an SR are transmitted together in the subframe, and
    wherein based on multi-radio dual connectivity (MR-DC) between evolved universal terrestrial radio access (E-UTRA) and new radio (NR) being configured for the UE, (i) the HARQ information and (ii) the SR are transmitted in a resource related to physical uplink control channel (PUCCH) format 3, and
    wherein, based on dual connectivity (DC) is configured for the UE and the DC being not the MR-DC, (i) the HARQ information and (ii) the SR are transmitted in a resource related to PUCCH format 1b.

2. The method according to claim 1, wherein based on a transmission of second HARQ information for a semi-persistent scheduling (SPS) physical downlink shared channel (PDSCH) reception being configured in a subframe in which the HARQ information is transmitted, (i) the HARQ information and (iii) the second HARQ information are transmitted together in the subframe, and
    wherein based on MR-DC being configured for the UE, (i) the HARQ information and (ii) the second HARQ information are transmitted in a resource related to PUCCH format 3.

3. The method according to claim 1, wherein based on MR-DC being configured for the UE and a system information block-uplink-downlink (SIB-UL-DL) configuration configured for the UE, UL-DL configurations available as a downlink reference UL-DL configuration are determined.

4. The method according to claim 3, wherein based on the UL-DL configurations available as the DL reference UL-DL configuration, a UL reference UL-DL configuration for a transmission of UL data is configured.

5. A user equipment (UE) for transmitting and receiving a signal in a wireless communication system, the UE comprising:
    at least one transceiver;
    at least one processor; and
    at least one memory operably coupled to the at least one processor and storing instructions which when executed, cause the at least one processor to perform a specific operation,
    wherein the specific operation includes:
    receiving downlink data on a primary cell (PCell), wherein a value of a downlink assignment index (DAI) included in Downlink Control Information (DCI) for scheduling the downlink data is 1; and
    transmitting hybrid automatic repeat request (HARQ) information for the downlink data,
    wherein based on a scheduling request (SR) transmission being configured in a subframe in which the HARQ information is transmitted, (i) the HARQ information and (ii) an SR are transmitted together in the subframe, and
    wherein based on multi-radio dual connectivity (MR-DC) between evolved universal terrestrial radio access (E-UTRA) and new radio (NR) being configured for the UE, (i) the HARQ information and (ii) the SR are transmitted in a resource related to physical uplink control channel (PUCCH) format 3, and
    wherein, based on dual connectivity (DC) is configured for the UE and the DC being not the MR-DC, (i) the HARQ information and (ii) the SR are transmitted in a resource related to PUCCH format 1b.

6. The UE according to claim 5, wherein based on a transmission of second HARQ information for a semi-persistent scheduling (SPS) physical downlink shared channel (PDSCH) reception being configured in a subframe in which the HARQ information is transmitted, (i) the HARQ information and (iii) the second HARQ information are transmitted together in the subframe, and
wherein based on MR-DC being configured for the UE, (i) the HARQ information and (ii) the second HARQ information are transmitted in a resource related to PUCCH format 3.

7. The UE according to claim 5, wherein based on MR-DC being configured for the UE and a system information block-uplink-downlink (SIB-UL-DL) configuration configured for the UE, UL-DL configurations available as a downlink reference UL-DL configuration are determined.

8. The UE according to claim 7, wherein based on the UL-DL configurations available as the DL reference UL-DL configuration, a UL reference UL-DL configuration for a transmission of UL data is configured.

9. An apparatus for a user equipment (UE), comprising:
at least one processor; and
at least one computer memory operably coupled to the at least one processor and when executed, causing the at least one processor to perform an operation,
wherein the operation includes:
receiving downlink data on a primary cell (PCell), wherein a value of a downlink assignment index (DAI) included in Downlink Control Information (DCI) for scheduling the downlink data is 1; and
transmitting hybrid automatic repeat request (HARQ) information for the downlink data,
wherein based on a scheduling request (SR) transmission being configured in a subframe in which the HARQ information is transmitted, (i) the HARQ information and (ii) an SR are transmitted together in the subframe, and
wherein based on multi-radio dual connectivity (MR-DC) between evolved universal terrestrial radio access (E-UTRA) and new radio (NR) being configured for the UE, (i) the HARQ information and (ii) the SR are transmitted in a resource related to physical uplink control channel (PUCCH) format 3, and
wherein, based on dual connectivity (DC) is configured for the UE and the DC being not the MR-DC, (i) the HARQ information and (ii) the SR are transmitted in a resource related to PUCCH format 1b.

10. The apparatus according to claim 9, wherein based on a transmission of second HARQ information for a semi-persistent scheduling (SPS) physical downlink shared channel (PDSCH) reception being configured in a subframe in which the HARQ information is transmitted, (i) the HARQ information and (iii) the second HARQ information are transmitted together in the subframe, and
wherein based on MR-DC being configured for the UE, (i) the HARQ information and (ii) the second HARQ information are transmitted in a resource related to PUCCH format 3.

11. The apparatus according to claim 9, wherein based on MR-DC being configured for the UE and a system information block-uplink-downlink (SIB-UL-DL) configuration configured for the UE, UL-DL configurations available as a downlink reference UL-DL configuration are determined.

12. The apparatus according to claim 11, wherein based on the UL-DL configurations available as the DL reference UL-DL configuration, a UL reference UL-DL configuration for a transmission of UL data is configured.

* * * * *